United States Patent
Kim et al.

(10) Patent No.: US 8,209,453 B2
(45) Date of Patent: Jun. 26, 2012

(54) ARBITER, A SYSTEM AND A METHOD FOR GENERATING A PSEUDO-GRANT SIGNAL

(75) Inventors: Young-Doug Kim, Suwon-si (KR);
Kyoung-Mook Lim, Yongin-si (KR);
Nak-Hee Seong, Gwacheon-si (KR);
Seh-Woong Jeong, Seoul (KR);
Jae-Hong Park, Seongnam-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 1266 days.

(21) Appl. No.: 10/737,124

(22) Filed: Dec. 17, 2003

(65) Prior Publication Data
US 2004/0236887 A1 Nov. 25, 2004

(30) Foreign Application Priority Data
May 23, 2003 (KR) .................... 10-2003-0033048

(51) Int. Cl.
*G06F 13/36* (2006.01)
(52) U.S. Cl. ................. 710/113; 710/116
(58) Field of Classification Search .......... 710/107, 710/110, 112, 113, 116, 117, 305, 306, 240–244
See application file for complete search history.

(56) References Cited

U.S. PATENT DOCUMENTS

| | | | | |
|---|---|---|---|---|
| 4,481,572 A * | 11/1984 | Ochsner | ............ | 710/117 |
| 4,667,192 A * | 5/1987 | Schmid et al. | ............ | 340/825.5 |
| 5,933,616 A | 8/1999 | Pecone et al. | | |
| 5,935,234 A * | 8/1999 | Arimilli et al. | ............ | 710/244 |
| 6,073,199 A | 6/2000 | Cohen | | |
| 6,393,506 B1 * | 5/2002 | Kenny | ............ | 710/113 |
| 6,671,761 B2 * | 12/2003 | Kim | ............ | 710/244 |
| 6,691,193 B1 * | 2/2004 | Wang et al. | ............ | 710/200 |
| 6,763,415 B1 * | 7/2004 | Tischler | ............ | 710/240 |
| 6,857,035 B1 * | 2/2005 | Pritchard et al. | ............ | 710/110 |
| 7,143,220 B2 * | 11/2006 | Edirisooriya et al. | ............ | 710/113 |

FOREIGN PATENT DOCUMENTS

| | | |
|---|---|---|
| EP | 0 346 398 B1 | 6/1994 |
| JP | 61210463 | 9/1986 |
| KR | 2001-0083932 | 9/2001 |
| WO | 88/08579 | 11/1988 |

OTHER PUBLICATIONS

AMBA Specification, Rev. 2.0, 1999.*
SDRAM Definition from Wikipedia, the free encyclopedia.*
Korean Office Action with English translation dated Feb. 22, 2005.
French Preliminary Search Report dated Jun. 27, 2005, for French Application No. FR 0405490.
German Office Action dated Jan. 25, 2008.

* cited by examiner

*Primary Examiner* — Khanh Dang
(74) *Attorney, Agent, or Firm* — Harness, Dickey & Pierce, P.L.C.

(57) ABSTRACT

An arbiter, a system, and a method for generating a pseudo-grant signal in response to a request and receiving target information in response to the pseudo-grant signal. The pseudo-grant signal reduces or eliminates waiting time.

43 Claims, 11 Drawing Sheets

ARBITER, A SYSTEM AND A METHOD FOR GENERATING A PSEUDO-GRANT SIGNAL

BACKGROUND OF THE INVENTION

This U.S. nonprovisional application claims priority under 35 U.S.C. §119 to Korean Patent Application No. 2003-33048 filed May 23, 2003, the contents of which are incorporated by reference in its entirety.

Arbitration mechanisms for improving bus bandwidth between at least one master and at least one target slave are known. The basic operation of such an arbitration includes a request, arbitration, grant, and data transfer.

When an arbiter grants bus ownership to a master, who requested access to a target slave, but the slave is unavailable to accommodate the data transfer, the result is a wasted grant of ownership, because the master must wait until the target slave is available for the data transfer. When the master accesses a target slave having long latency, the bandwidth is also degraded.

FIG. 1 illustrates a conventional timing diagram, which illustrates a waiting time T. As shown in FIG. 1, a first set of address information ADDR1-4 is supplied, followed by a first set of data DATA D1-D4. Subsequently, a second set of address information ADDR5-8 is supplied, followed by a second set of data DATA D5-D8. As shown in FIG. 1, the waiting time T is a delay between the availability of data DATA D4 and D5. This delay is undesirable. FIG. 2 illustrates a desirable timing diagram where the waiting time T is eliminated.

Bank interleaving has been used as a conventional technique to divide a memory into several banks, thereby permitting successive accesses to each bank. In bank interleaving, operations to each of the two banks is overlapped, for example, data is accessed in one bank and pre-charged in another bank simultaneously, in order to improve the bus bandwidth.

However, there are disadvantages with bank interleaving. In particular, only after the master receives bus ownership based on an arbitration, can the master drive the valid address and control information. Therefore, this information cannot be used for arbitration because the information is generated after the arbitration. As a result, bandwidth improvements are limited. Further, because the request to the target slave can not be sent in advance, a waiting time delay, such as T described above, still exists.

Other conventional devices include having a master generate a cycle type signal at the same time as a request. The cycle type signal indicates the specific target resource (slave) to be accessed and whether the target is to be read or written. Based on the cycle type signal and the related target resource information, the arbiter determines the priority of bus ownership. In this manner, a target slave retry cycle is avoided and bus bandwidth and overall system performance may be improved. However, additional pins are required to implement the cycle type signal and because the request to the target slave can not be sent in advance, the waiting time delay, such as T, still exists.

FIG. 3 illustrates a conventional bus architecture, including masters 1-3, an arbiter 4, an SDRAM controller 5, and an SDRAM bank 6. Each master 1-3 requests bus access from the arbiter 4, via an HBUSREQN signal. The arbiter 4, which includes arbitration logic for selecting one of the masters 1-3, performs arbitration and grants access to the bus via an HGRANTN signal, which is supplied to the selected one among the masters 1-3. As shown in FIG. 3, the HADDRN, HWRITEN, HBURSTN, HSIZEN, and HTRANN signals are each signals to drive a target slave. These signals are supplied from the masters 1-3 to the SDRAM controller 5 via one or more multiplexers (MUXs) 7-8. The MUXs 7-8 receive an HMASTER signal from the arbiter 4 and forward the selected HDDR, HWRITER, HBURSTR, HSIZER, and/or HTRANR to the SDRAM controller 5. MUX 7 receives an HWDATAN signal from each of the masters 1-3 and forwards the selected one among the HWDATAN signals as a BIW-DATA signal to the SDRAM controller 5. The SDRAM controller 5, when ready, sends a BIREADYD signal to each of the masters 1-3. The SDRAM controller 5 also exchanges signals and data back and forth between the SDRAM 6.

FIG. 4 illustrates a timing diagram of a conventional bus architecture. As indicated in FIG. 4, a waiting time T exists between the transfer of the first data B0D0-B0D3 and the second data B1D0-B1D3. This waiting time T reduces bus bandwidth efficiency and is caused by the fact the arbiter cannot request the target slave to prepare for data access prior to receiving the bus ownership through arbitration.

SUMMARY OF THE INVENTION

In exemplary embodiments, the present invention is directed to an arbiter in a system for generating a pseudo-grant signal to all requesting master units and for receiving transaction information from all requesting master units in response to the pseudo-grant signal.

In exemplary embodiments, the present invention is directed to a system which includes at least one master unit for generating a request, an arbiter for receiving the request from the at least one master unit and for generating a pseudo-grant signal in response to the request from the at least one master unit, the at least one master unit supplying target information to the arbiter in response to the pseudo-grant signal, and at least one slave unit preparing for data transfer in response to the target information supplied by the at least one master unit.

In exemplary embodiments, the present invention is directed to a method of performing arbitration in a system, which includes generating a pseudo-grant signal in response to a request, and receiving target information in response to the pseudo-grant signal.

In exemplary embodiments, the present invention is directed to a method of performing arbitration in a system, which includes generating a request, receiving the request and generating a pseudo-grant signal in response to the request, supplying target information in response to the pseudo-grant signal, and preparing for data transfer in response to the target information.

BRIEF DESCRIPTION OF THE DRAWINGS

The present invention will become more fully understood from the detailed description given below and the accompanying drawings, which are given for purposes of illustration only, and thus do not limit the invention.

DETAILED DESCRIPTION OF THE EXEMPLARY EMBODIMENTS

Figure 1:
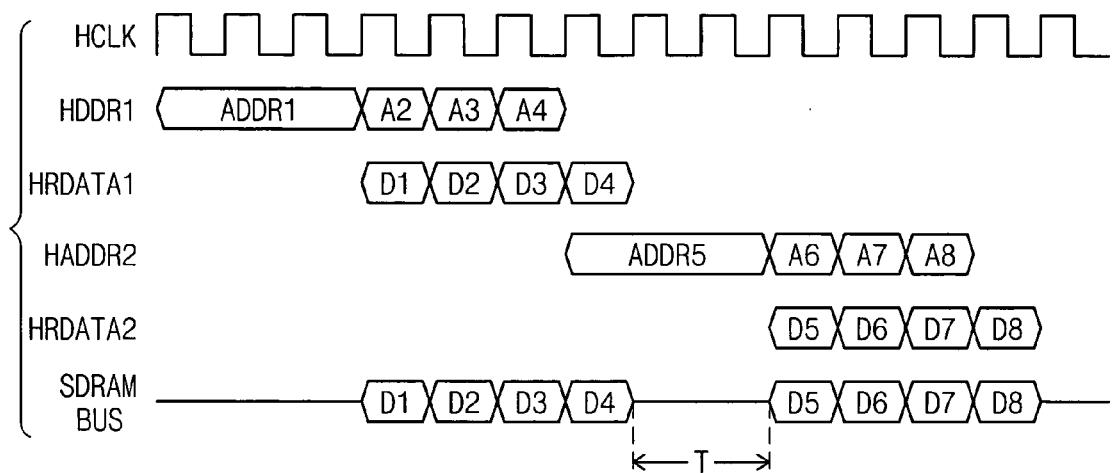
FIG. 1 illustrates a conventional timing diagram, which illustrates a waiting time T.
Figure 2:
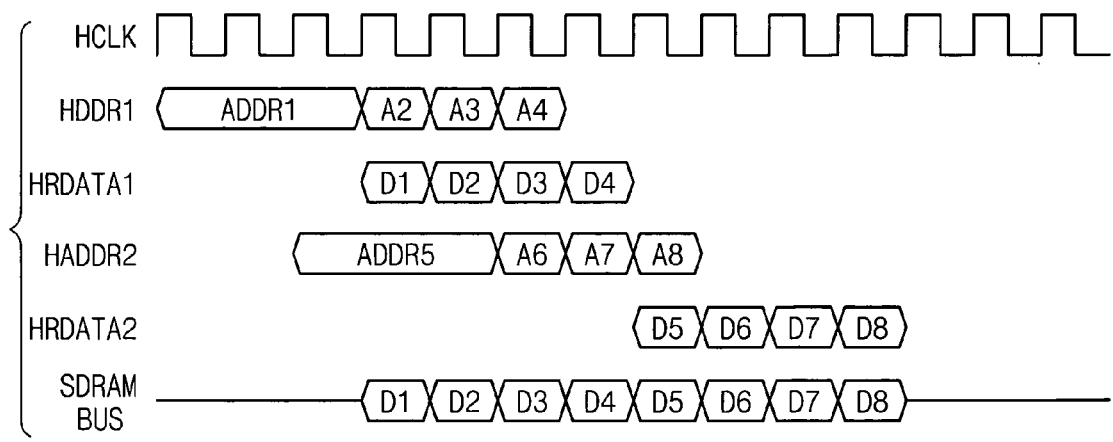
FIG. 2 illustrates a desirable timing diagram where the waiting time T is eliminated.
Figure 3:
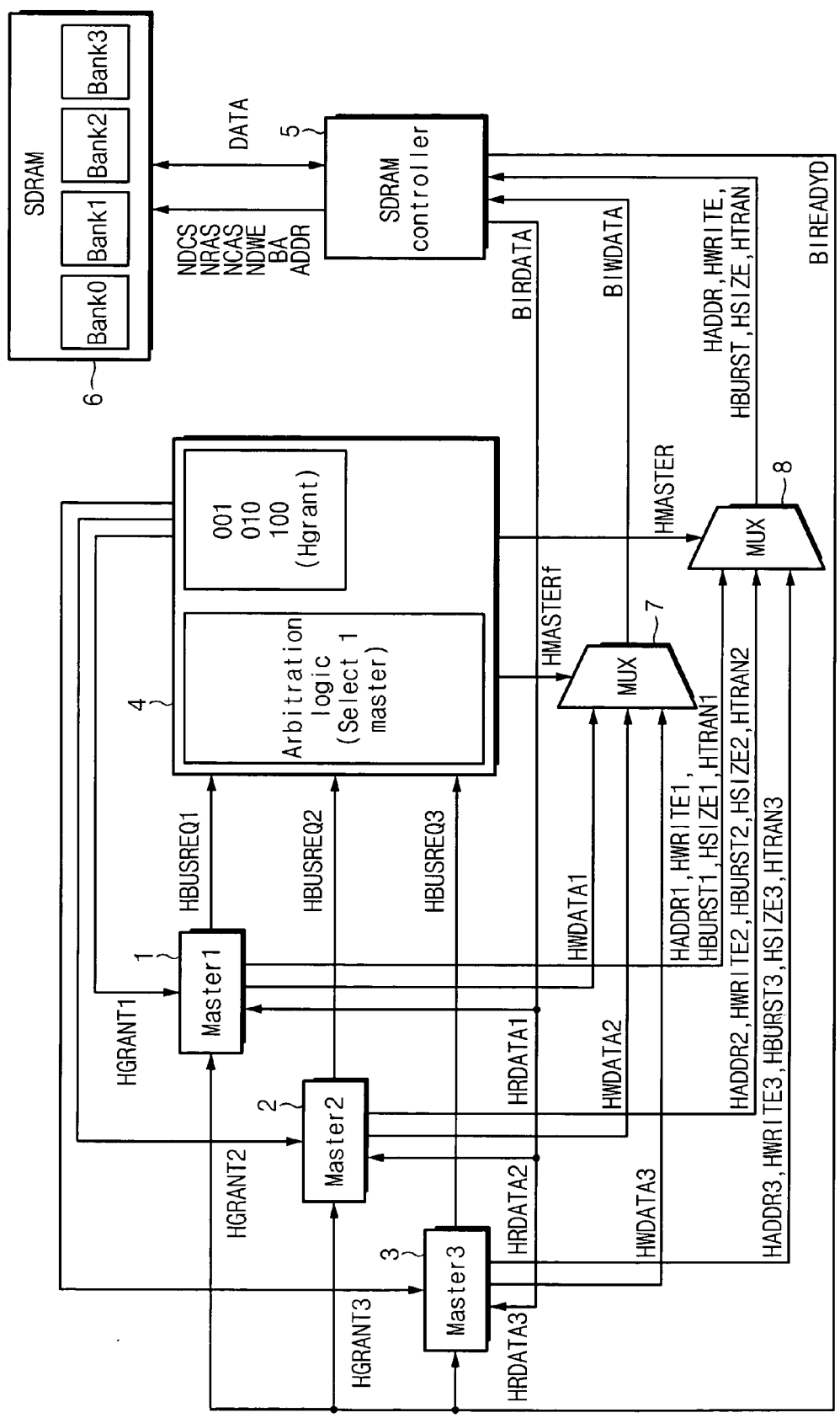
FIG. 3 illustrates a conventional bus architecture.
Figure 4:
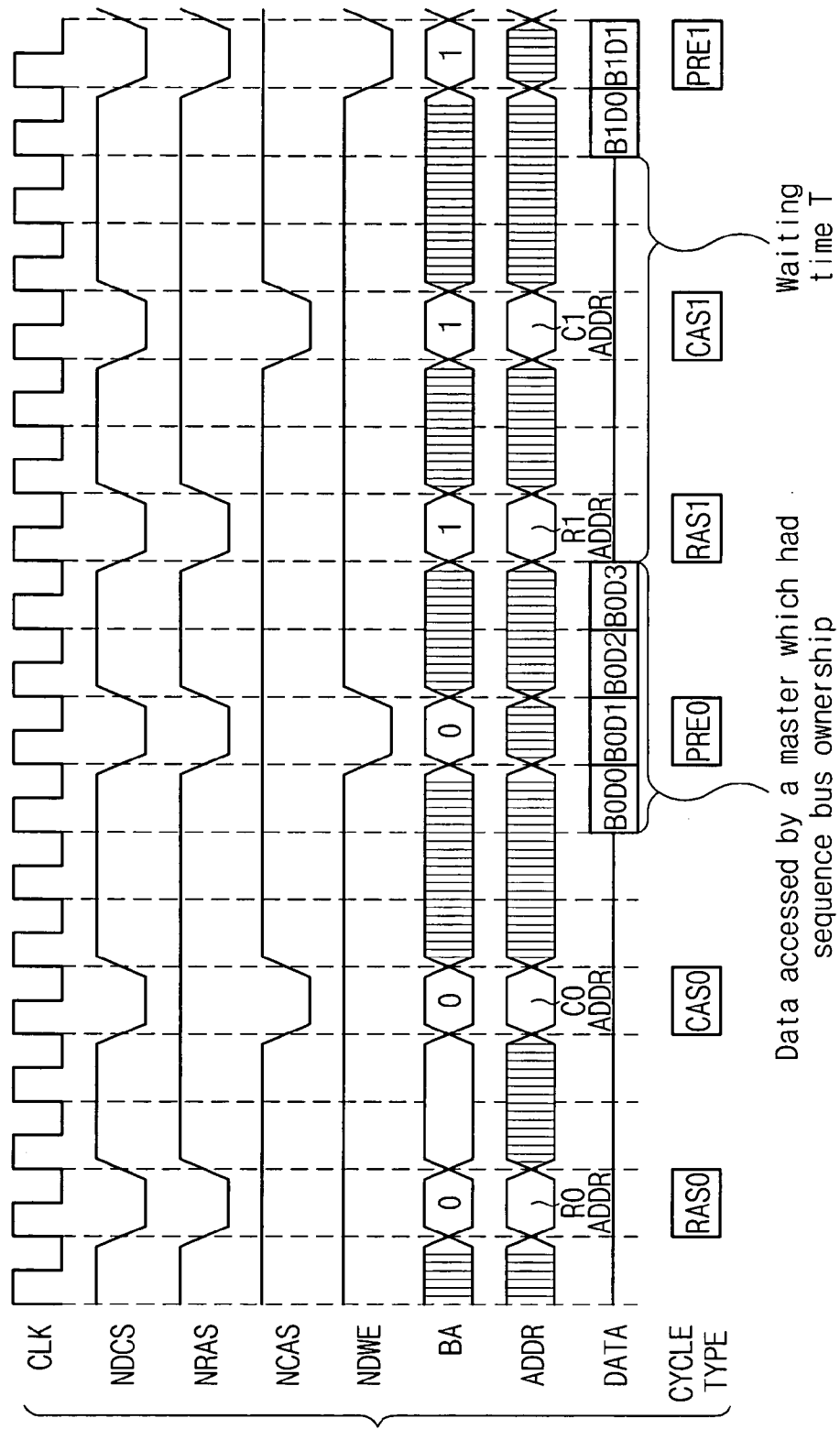
FIG. 4 illustrates a timing diagram of a conventional bus architecture.
Figure 5:
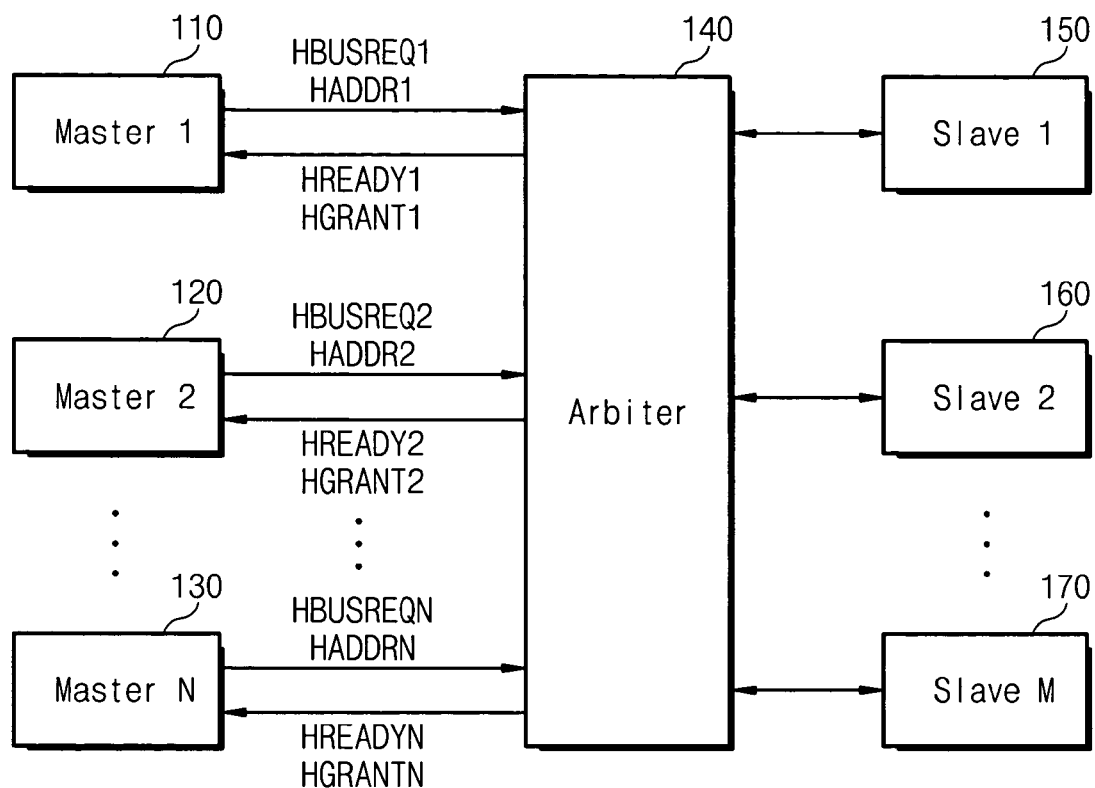
FIG. 5 illustrates a bus arbitration structure in accordance with an exemplary embodiment of the present invention.

FIG. 5 illustrates a bus arbitration structure in accordance with an exemplary embodiment of the present invention. As illustrated in FIG. 5, the bus arbitration structure includes N master units 110, 120, 130 where N is greater than or equal to one, an arbiter 140, and M slave units 150, 160, 170 where M is greater than one and not necessarily equal to N. In operation, each master unit 110, 120, 130 sends a request HBUSREQN to the arbiter 140. The HBUSREQ signal is a request signal to access a target slave, for example, slaves 150, 160, or 170. The arbiter 140 provides a pseudo grant signal HGRANT to each of the N requesting master units 110, 120, 130. The HGRANT signal is a signal to grant bus ownership to a master. Each of the N master units 110, 120, 130 then provides target information to the arbiter 140 for the arbiter 140 to perform arbitration. In the exemplary embodiment illustrated in FIG. 5, the target information is signal HADDRN. The arbiter 140 performs arbitration and indicates data transfer is ready to occur by providing each master 110, 120 with a ready signal, HREADYN.

When two or more masters 110, 120, 130 request access to a bus, the HBUSREQN signals are asserted. In an exemplary embodiment of the present invention, in such a situation, the arbiter 140 grants a "fake" or "pseudo" ownership to all of the requesting masters 110, 120, 130 by returning an HGRANTN signal prior to arbitration. The masters 110, 120, 130 receiving bus ownership, drive the desired information regarding the target slave (for example, HADDRN). The arbiter 140 utilizes this information and associated target slave information in order to perform the act of arbitration. After arbitration and checking the bus availability, the arbiter 140 sends the active HREADY signal to the selected master to indicate which actually has bus ownership.

Conventionally, an HGRANT signal is granted after arbitration. In exemplary embodiments of the present invention, the HGRANT signal is granted after a request, but prior to arbitration, as discussed above.

Figure 6:
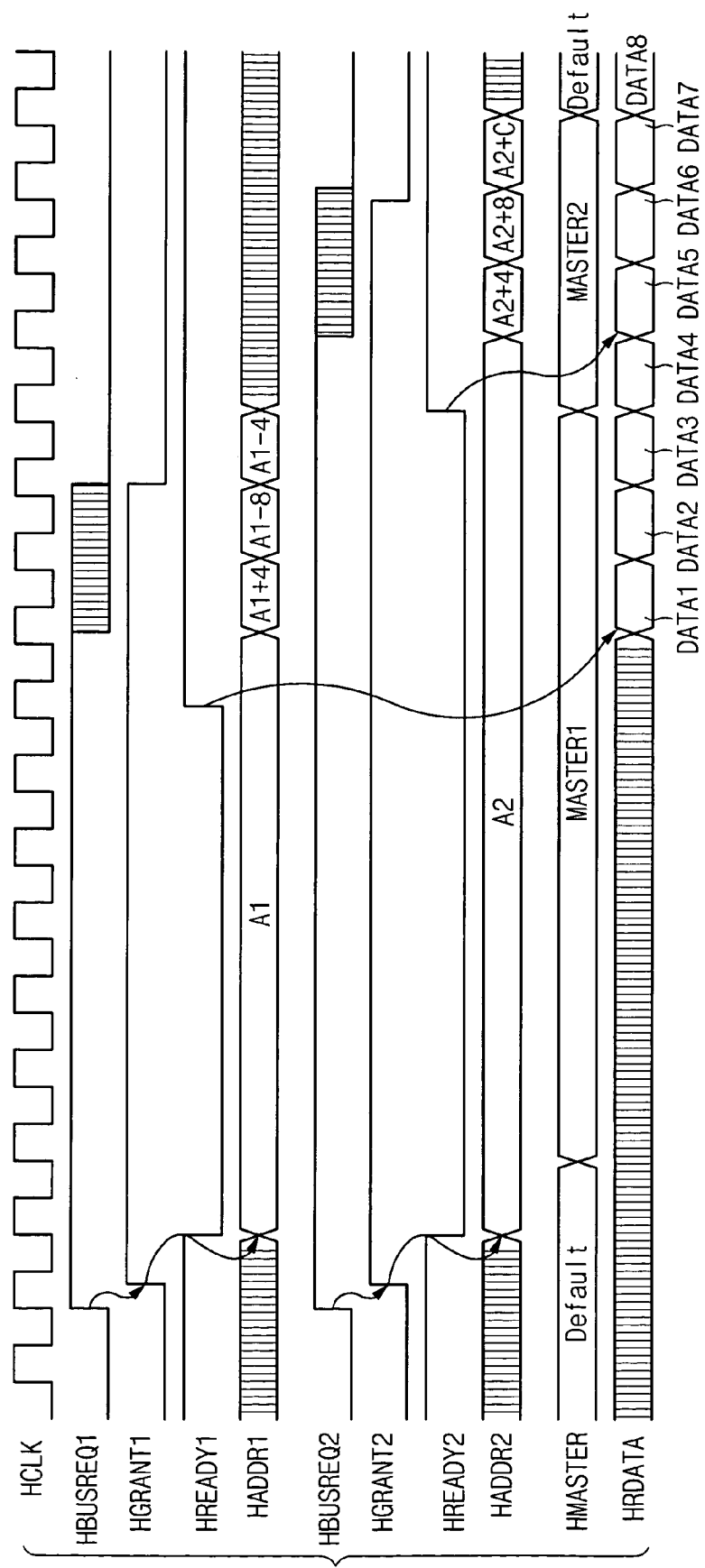
FIG. 6 illustrates a timing diagram in accordance with an exemplary embodiment of the present invention.

FIG. 6 illustrates an exemplary timing diagram of the present invention. As illustrated in FIG. 6, the HGRANT1 signal is triggered to high in response to the HBUSREQ1 signal. Further, HADDR1 signal is generated in response to a transition to high of HGRANT1 signal and is synchronized with HCLK. Similarly, the HGRANT2 signal is triggered to high in response to the HBUSREQ2 signal. Further, the HADDR2 signal is generated in response to a transition to high of HGRANT2 signal and is synchronized with HCLK. As also shown in FIG. 6, the data information HRDATA, including DATA1 is generated in response to the HREADY1 signal and the data, in particular DATA5, is generated in response to the HREADY2. As shown in FIG. 6, the arbiter 140 receives the HADDR2 signal from the master 110, 120, 130 earlier in the exemplary embodiment of the present invention, thereby reducing a timing delay.

Figure 7:
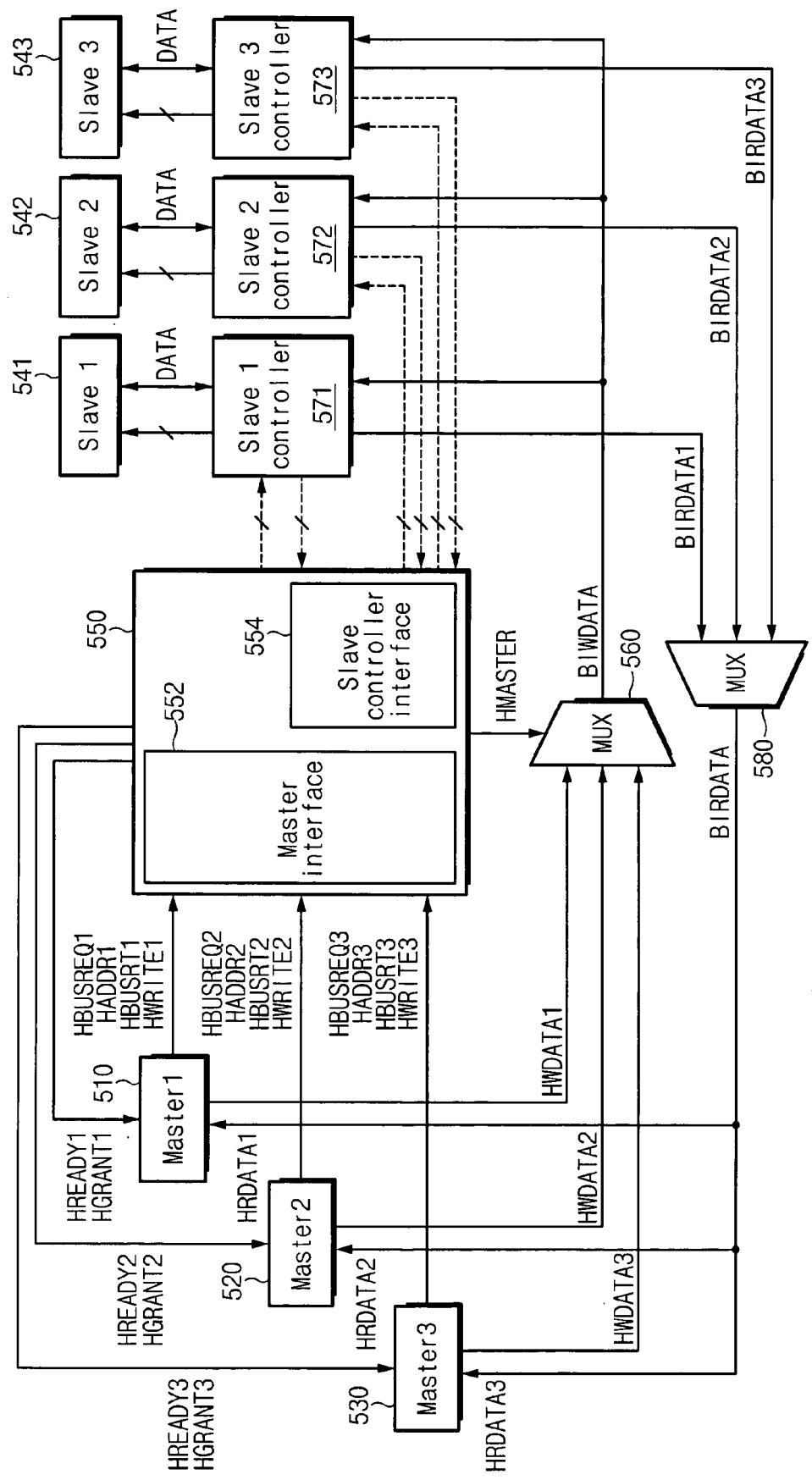
FIG. 7 illustrates a more detailed bus architecture of FIG. 5 in accordance with an exemplary embodiment of the present invention.

In FIGS. 7 and/or 8, the HADDR, HBURST, HWRITE signals are each signals to drive the target slave. The BIREQD signal is a signal to request a target slave to prepare for data access. The BIADDR, BIBA, BIRCONT, BICCONT are all signals including information to control a target slave. The BICONFIRMD signal is an acknowledgement (ACK) signal to the BIREQD signal. The NDCAS, NRAS, NCAS, NDWE signals are command signals to access a target slave or in other exemplary embodiments, a particular, specific memory bank. The BA signal is a bank address signal, the BIREADYD signal is a signal that is triggered to be activated when a target slave is ready to accommodate a data transfer. The HREADYN signal is a signal to indicate that a particular master now has the bus ownership for a data transfer from/to a target slave.

FIG. 7 illustrates a more detailed bus architecture of FIG. 5 in accordance with an exemplary embodiment of the present invention. As illustrated in FIG. 7, the arbiter 550 includes a master interface 552 and a slave controller interface 554. The master interface 552 interacts with the N master units 510, 520, 530 and the slave controller interface 554 interacts with M slave controllers 571, 572, 573. The M slayer controllers 721, 572, 573 control one or more slave units 541, 542, 543.

As indicated in FIG. 7, each master unit 510, 520, 530 provides an HBUSREQ signal to the arbiter 550. The arbiter 550 generates an HGRANT signal to each of the master units. Each of the master units then provides an HADDR signal, an HBURST signal, and/or an HWRITE signal to the arbiter 550.

Each of the master units 510, 520, 530 supplies an HWDATAn signal to a multiplexer (MUX) 560 and a selected one of HWDATAn as BIWDATA is supplied to the slave controllers 571, 572, 573. The slave controllers 571, 572, 573 transfer data to and from the slave units 541, 542, 543. The slave controllers 571, 572, 573 also provide a BIRDATAn signal to a multiplexer (MUX) 580 and a selected one of BIRDATAn as BIRDATA is supplied to the master units 510, 520, 530.

Figure 8:
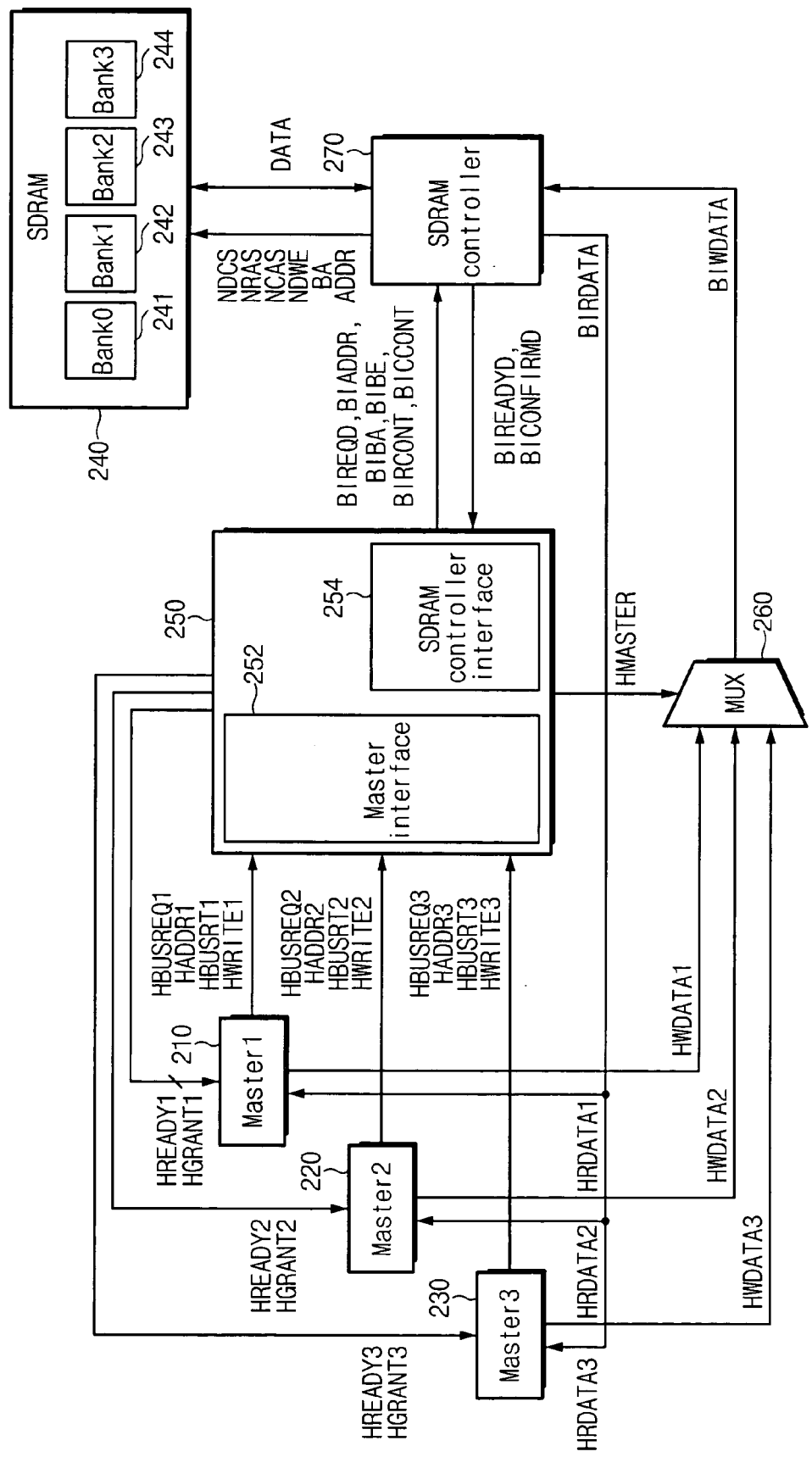
FIG. 8 illustrates another exemplary detailed architecture of the general bus arbitration scheme illustrated in FIG. 5.

FIG. 8 illustrates another exemplary detailed architecture of the general bus arbitration scheme illustrated in FIG. 5. As shown in FIG. 8, the arbiter 250 includes a master interface 252 and an SDRAM controller interface 254. The master interface 252 interacts with the master units 210, 220, 230 and multiplexer 260, in much the same way as described above in conjunction with FIG. 7. The SDRAM controller interface 254 supplies BIREQD, BIADDR, BIBA, BIBE, BIRCONT, and BICCONT signals to an SDRAM controller 270 and receives a BIREADYD, and BICONFIRMD signal from the SDRAM controller 270. The SDRAM controller receives BIWDATA from the selected one of the master units 210, 220, 230 of the MUX 260 and provides BIRDATA to the selected one of the master units 210, 220, 230. The SDRAM controller 270 supplies NDCS, NRAS, NCAS, NDWE, BA, and ADDR signals to an SDRAM 240 and receives data back from the SDRAM 240. In an exemplary embodiment, the SDRAM 240 includes one or more memory banks, identified as elements 241, 242, 243, and 244.

Figure 9:
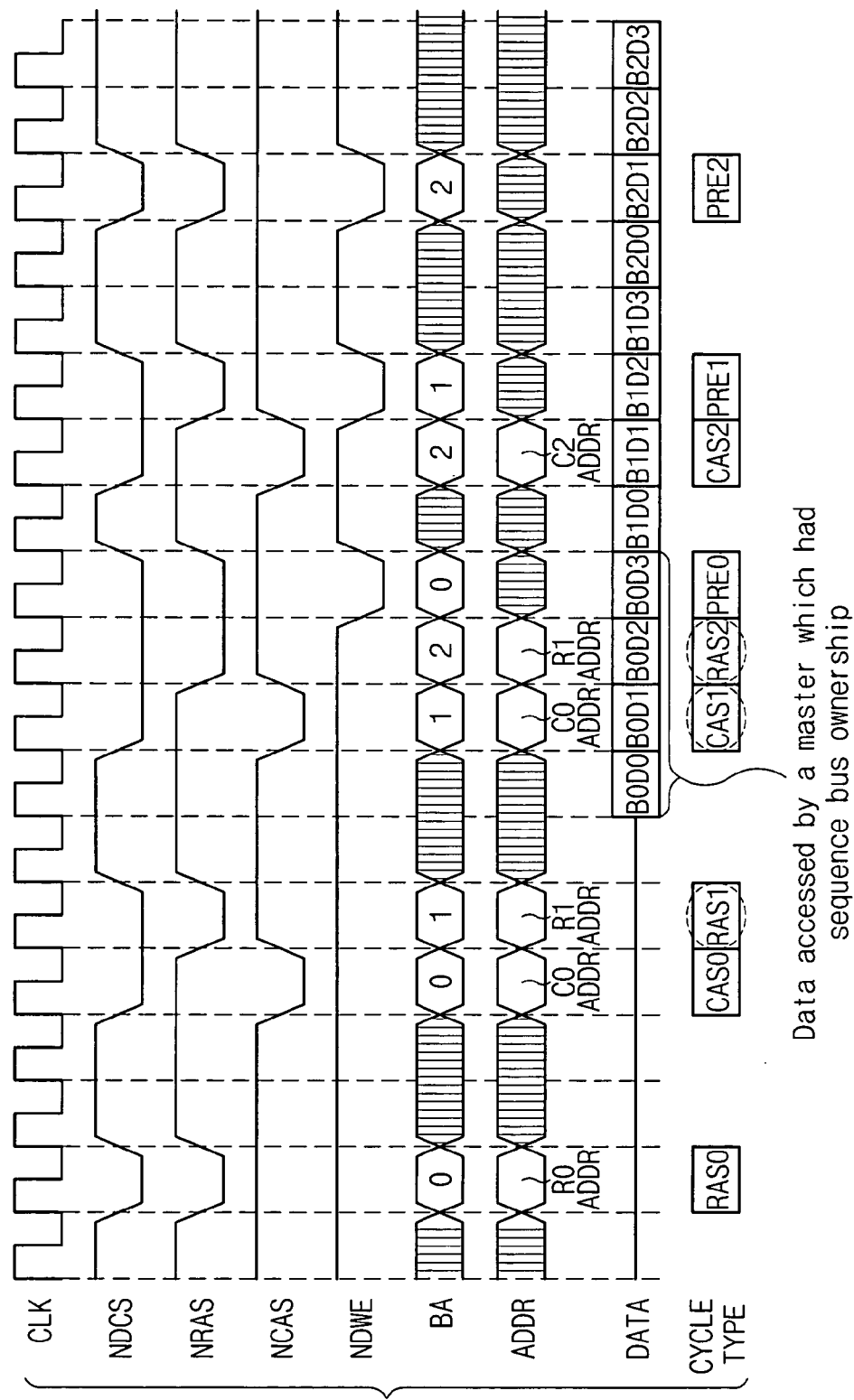
FIG. 9 illustrates an exemplary timing diagram in accordance with the present invention.
Figure 10:
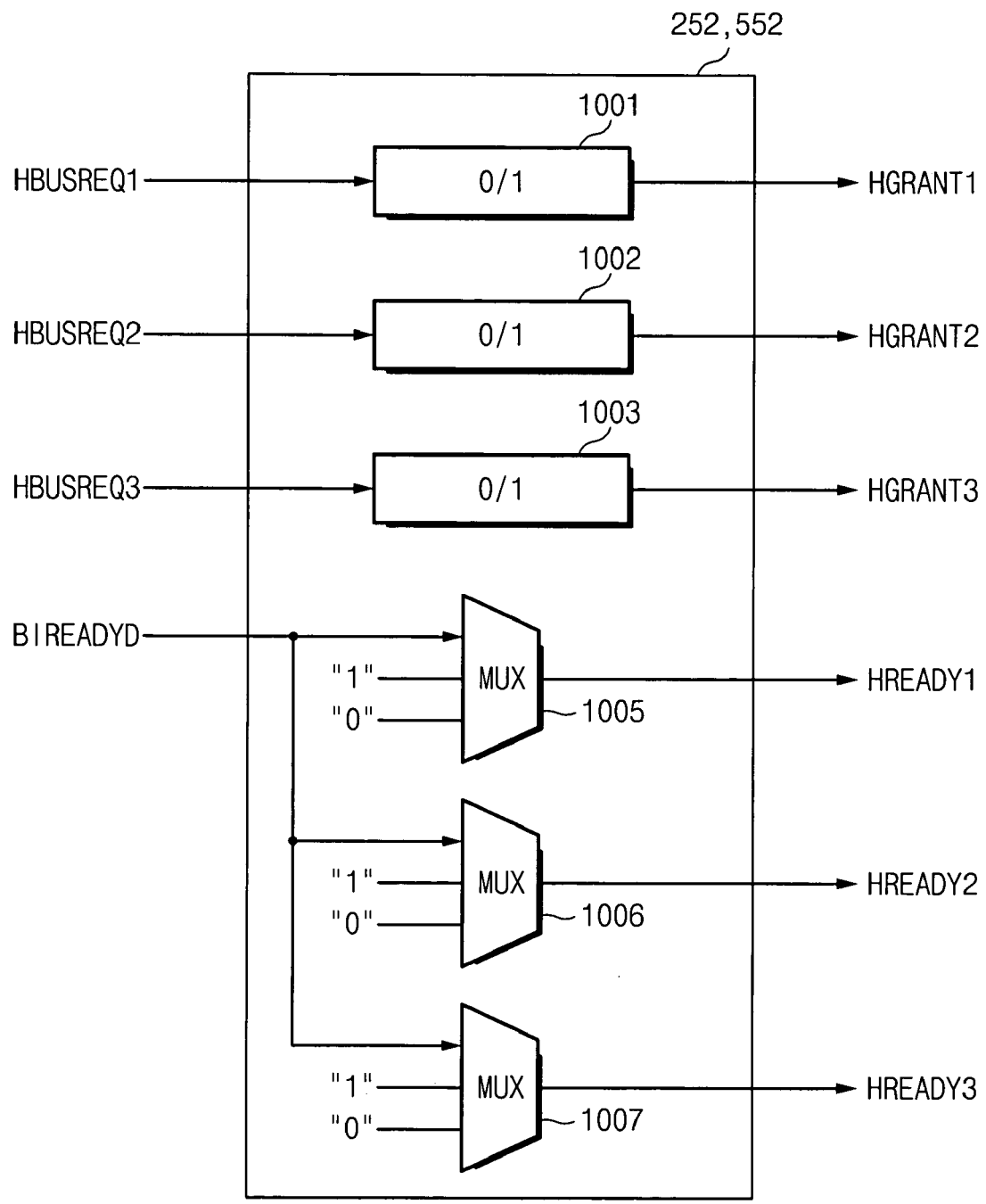
FIG. 10 illustrates the master interface illustrated in FIG. 7 or 8 in accordance with an exemplary embodiment of the present invention.

FIG. 9 illustrates an exemplary timing diagram in accordance with the present invention. As illustrated in FIG. 9, the master is able to send information early because the arbiter permits early sending via the pseudo grant signal. The arbiter may request the slave to prepare for data transfer via the RAS1 and CAS1 signals because the arbiter can receive the information of the target slave early FIG. 10 illustrates an exemplary embodiment of the master interface illustrated in FIG. 7 or 8. As shown in FIG. 10, the master interface 252, 552, includes synchronizer units 1001, 1002, 1003, each of which receives an HBUSREQ signal from a master unit and outputs an HGRANT signal. The master interface 252, 552 further includes multiplexers (MUXs) 1005, 1006, 1008 which receive the BIREADYD signal indicating that the target slaves are ready to transmit data and output one or more HREADY signals. As indicated in FIG. 10, the master interface 252, 552 need not include any arbitration logic.

Figure 11:
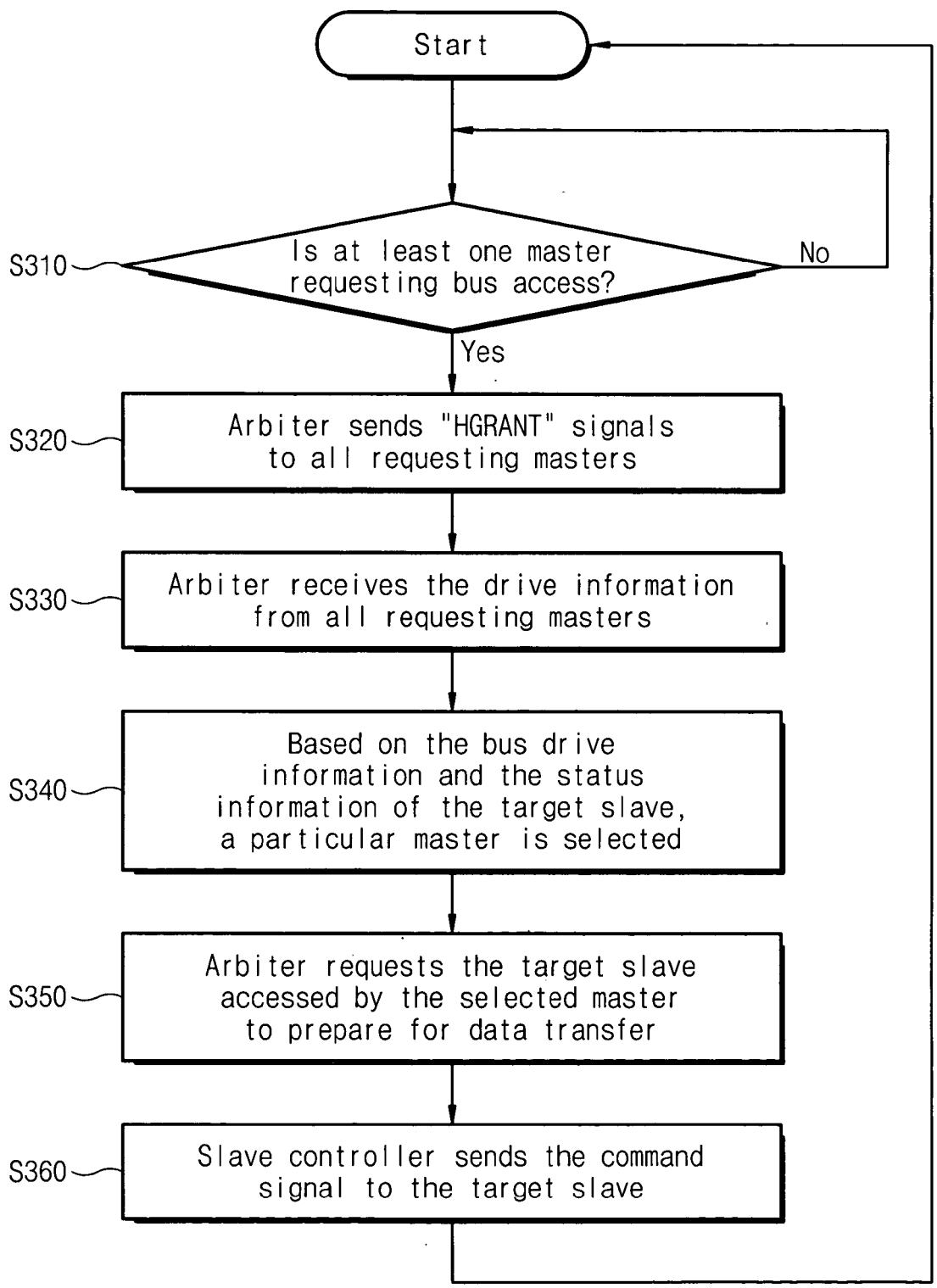
FIG. 11 illustrates a flow chart of a first stage of a method in accordance with an exemplary embodiment of the present invention.

FIG. 11 illustrates a flow chart in accordance with an exemplary embodiment of the present invention. As shown at step 310, the arbiter determines whether at least one master is requesting bus access. If not, the arbiter stays in a holding loop. If yes, the arbiter sends an HGRANT signal to all requesting master units at step S320. At step S330, the arbiter receives drive information from all requesting master units. At step 340, based on the bus drive information and the status information of the target slave, a particular master is selected by the arbiter.

At step S350, to reduce latencies associated with the target slave regardless of bus availability, the arbiter request the target slave accessed by the selected master to prepare for data transfer. At S360, the slave controller sends the command signal to the target slave. The flow chart illustrated in FIG. 11 may be considered a first stage of the exemplary method of the present invention.

Figure 12:
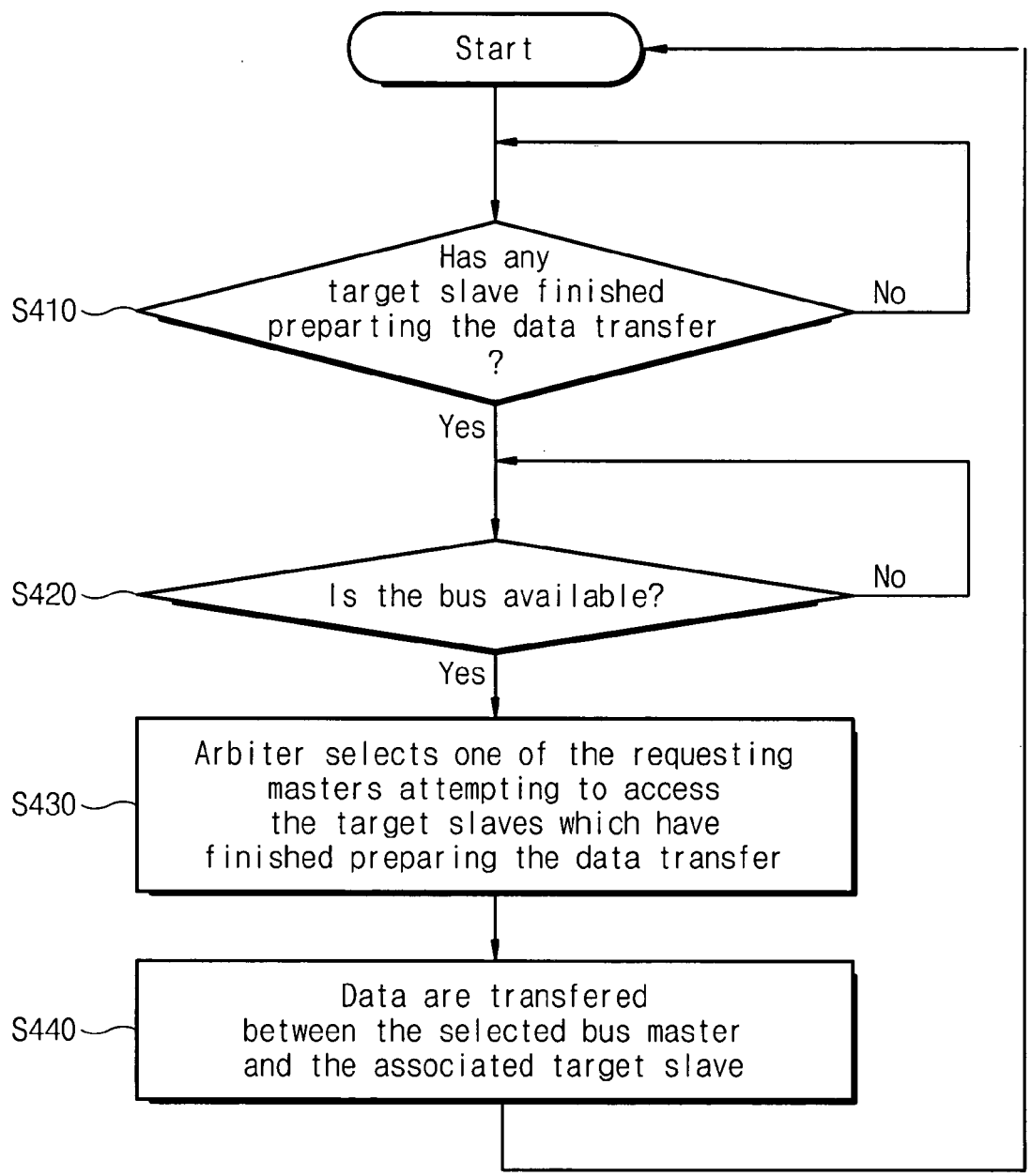
FIG. 12 illustrates a flow chart of a second stage of a method in accordance with an exemplary embodiment of the present invention.

FIG. 12 illustrates a second stage, where the arbiter determines at step 410, whether any target slaves have finished preparing the data transfer. If not, the arbiter stays in the holding loop. If yes, the arbiter determines at step 420 whether the bus is available. If the bus is not available, the arbiter stays in a holding loop. If the bus is available, the arbiter selects one of the requesting masters attempting to access target slaves which have finished preparing the data transfer, at step 430. At step 440, data is transferred between the selected bus master and the associated target slave and the process repeats.

As described above, exemplary embodiments of the present invention modify the order of arbitration signals from the conventional order. In particular, in exemplary embodiments, the pseudo grant signal precedes the arbitration. Further, in exemplary embodiments, the information transfer precedes the arbitration so that the information contained in the data transfer may be used in the arbitration decision. Exemplary embodiments of the present invention reduce or eliminate a waiting time T and/or enable better arbitration decisions due the additional information available.

Although the exemplary embodiments of the present invention describe specific controller interfaces and memories, any other interfaces and/or memories could be utilized, as would be known to one of ordinary skill in the art. Still further, although the exemplary embodiments of the present invention describe a particular bus contention, the teachings of the present invention could also used to resolve any other bus contention, or any other resource contention, as would be known to one of ordinary skill in the art The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

We claim:

1. An arbiter in a system, the arbiter comprising:
at least one interface for generating pseudo-grant signals to all requesting master units beginning at the same time and for receiving transaction information from all requesting master units in response to the pseudo-grant signals, wherein
the transaction information includes information on at least one target slave unit for each requesting master unit, and
the arbiter performs arbitration based on the information on the target slave unit for each requesting master unit by using the information on the target slave unit for each requesting master unit to determine a priority of bus ownership for the requesting master units.

2. The arbiter of claim 1, the arbiter further performing arbitration based on the transaction information received from all the requesting master units.

3. The arbiter of claim 1, the at least one interface including a master interface for generating the pseudo-grant signals to all the requesting master units, for receiving the transaction information from all the requesting master units in response to the pseudo-grant signals, and for generating a ready signal to a selected one of the requesting master units.

4. The arbiter of claim 3, the master interface including at least one generator for generating the pseudo-grant signals from at least one request signal from all the requesting master units.

5. The arbiter of claim 3, the master interface including at least one circuit for converting a target slave ready signal from at least one slave of the at least one target slave into a data transfer ready signal for a selected one of the requesting master units.

6. The arbiter of claim 3, wherein the ready signal is for data transfer.

7. The arbiter of claim 3, wherein the ready signal indicates bus availability.

8. The arbiter of claim 1, the at least one interface including a controller interface for requesting at least one slave unit to prepare for data transfer in response to the transaction information from the selected one of the requesting master units.

9. The arbiter of claim 8, wherein the controller interface is a slave controller interface which interacts with at least one slave controller of the at least one slave unit.

10. The arbiter of claim 9, wherein each slave controller controls at least one slave memory.

11. The arbiter of claim 8, wherein the controller interface is an SDRAM controller interface which interacts with at least one SDRAM controller of the at least one slave unit.

12. The arbiter of claim 11, wherein each SDRAM controller controls at least one SDRAM memory bank.

13. The arbiter of claim 1, wherein a request from all the requesting master units is synchronized with a system clock.

14. The arbiter of claim 1, wherein the at least one interface generates the pseudo-grant signals to all requesting master units at the same time prior to arbitration.

15. The method of claim 1, wherein the arbiter does not perform the arbitration based on priorities pre-assigned to the master units and does not perform the arbitration based on priorities received from the master units.

16. The method of claim 1, wherein the arbiter performs the arbitration based only on the information on the target slave for each requesting master and status information for each of the target slaves.

17. The method of claim 1, wherein the arbiter performs the arbitration based on the transaction information, the transaction information being received in response to the pseudo grant signals, the pseudo grant signals being received before the transaction information.

18. A system comprising:
 at least two master units for generating a request;
 an arbiter for receiving the request from the at least two master units and for generating pseudo-grant signals beginning at the same time in response to the request from the at least two master units;
 the at least two master units supplying target information to the arbiter in response to the pseudo-grant signals; and
 at least one slave unit preparing for data transfer in response to the target information supplied by the at least two master units, and wherein
 the target information includes information on at least one target slave unit for each requesting master unit, and
 the arbiter performs arbitration based on the information on the target slave unit for each requesting master unit by using the information on the target slave unit for each requesting master unit to determine a priority of bus ownership for the requesting master units.

19. The system of claim 18, wherein the at least one slave unit completes preparing for data transfer and data is transferred between one of the at least two master units and one of the at least one slave units.

20. The system of claim 18, wherein all requesting master units in the system receive the pseudo-grant signals from the arbiter.

21. The system of claim 18, wherein the request from the at least two master units is synchronized with a system clock.

22. The system of claim 18, wherein the pseudo-grant signals from the arbiter and the target information from the at least two master units are synchronized.

23. The system of claim 18, wherein the arbiter generates the pseudo-grant signals to all requesting master units at the same time prior to arbitration.

24. A method of performing arbitration in a system, comprising:
 generating pseudo-grant signals, in response to at least two requests, beginning at the same time, and
 receiving target information in response to the pseudo-grant signals, the target information including information on at least one target slave unit associated with each request, and
 performing arbitration based on the information on the target slave unit associated with each request by using the information on the target slave unit associated with each request to determine a priority of bus ownership of a plurality of master units generating the at least two requests.

25. The method of claim 24, further comprising:
 performing arbitration based on the target information.

26. The method of claim 24, wherein the at least two requests and the target information are from the plurality of master units.

27. The method of claim 24, wherein the pseudo-grant signals are generated in response to all requests.

28. The method of claim 24, further comprising:
 requesting preparation for data transfer in response to the target information.

29. The method of claim 24, wherein the request is synchronized with a system clock.

30. The method of claim 24, wherein the method is hardware implemented.

31. A non-transitory computer-readable medium containing instructions which, when executed, causes a machine to perform the method of claim 24.

32. The method of claim 24, wherein the pseudo-grant signals are generated at the same time prior to arbitration.

33. A method of performing arbitration in a system, comprising:
 generating at least two requests;
 receiving the at least two requests and generating pseudo-grant signals in response to the at least two requests beginning at the same time;
 supplying target information in response to the pseudo-grant signals, the target information including information on at least one target slave unit associated with each request;
 preparing for data transfer in response to the target information; and
 performing arbitration based on the information on the target slave unit associated with each request by using the information on the target slave unit associated with each request to determine a priority of bus ownership of a plurality of requesting master units generating the at least two requests.

34. The method of claim 33, wherein the at least two requests and the target information are from the plurality of requesting master units.

35. The method of claim 34, further comprising:
 completing preparation of data transfer; and
 transferring data.

36. The method of claim 35, wherein said generating, receiving, supplying, and preparing constitute a first stage and said completing and transferring constitute a second stage and said first and second stages occur concurrently.

37. The method of claim 36, wherein completing preparation of data transfer includes determining whether a bus is available and selecting one of the requesting masters.

38. The method of claim 33, wherein the pseudo-grant signals are generated in response to all requests.

39. The method of claim 33, wherein the request is synchronized with a system clock.

40. The method of claim 33, wherein the method is hardware implemented.

41. A non-transitory computer-readable medium containing instructions which, when executed, causes a machine to perform the method of claim 33.

42. The method of claim 33, wherein the pseudo-grant signals are generated at the same time prior to arbitration.

43. An arbiter in a system, the arbiter comprising:
 at least one interface for generating pseudo-grant signals to all requesting master units beginning at the same time and for receiving transaction information from all requesting master units in response to the pseudo-grant signals, wherein
 each of the requesting master units sends a first signal to access a target slave to the at least one interface,
 the at least one interface generates the pseudo-grant signals beginning at the same time in response to the first signals, and
 each of the requesting master units sends the transaction information directly in response to the pseudo-grant signals.

* * * * *